US008667381B1

(12) United States Patent
Feng et al.

(10) Patent No.: US 8,667,381 B1
(45) Date of Patent: Mar. 4, 2014

(54) BLOCK DIAGRAM CHANGE HISTORY

(75) Inventors: Yang Feng, Natick, MA (US); Andrew C. Grace, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 1093 days.

(21) Appl. No.: 12/053,386

(22) Filed: Mar. 21, 2008

(51) Int. Cl.
*G06F 3/00* (2006.01)

(52) U.S. Cl.
USPC .......................................... 715/211

(58) Field of Classification Search
USPC ......... 715/230, 231, 232, 233, 234, 243, 254, 715/255, 211
See application file for complete search history.

(56) References Cited

U.S. PATENT DOCUMENTS

| | | | |
|---|---|---|---|
| 2007/0244777 A1* | 10/2007 | Torre et al. | 705/35 |
| 2007/0250299 A1* | 10/2007 | Paxson et al. | 703/11 |
| 2009/0070665 A1* | 3/2009 | Chijiiwa et al. | 715/235 |
| 2009/0132907 A1* | 5/2009 | Shao et al. | 715/234 |
| 2009/0144313 A1* | 6/2009 | Hodge et al. | 707/102 |

OTHER PUBLICATIONS

"Tech Tips for the Average Joe: How to select multiple files in windows explorer," Oct. 30, 2006, <http://basictech.wordpress.com/2006/10/30/how-to-select-multiple-files-in-windows-explored/>, pp. 1-2.*
http://www.mathworks.com/access/helpdesk/help/toolbox/simulink/index.html?/access/helpdesk/help/toolbox/simulink/ug/f4-146273.html, Last Accessed Mar. 21, 2008.
http://office.microsoft.com/en-us/visio/HP012315001033.aspx, Last Accessed Mar. 21, 2008.

* cited by examiner

*Primary Examiner* — Kyle Stork
(74) *Attorney, Agent, or Firm* — Venable LLP; Michael A. Sartori; Todd R. Farnsworth

(57) ABSTRACT

An element of a block diagram may be modified to produce a modified block diagram. A change record including a change entry associated with a modification of the element may be created. A commentary related to the modification may be received. The commentary may be associated with the change entry. The change record may be associated with the modified block diagram. The modification may be displayed. The change entry with the associated commentary my be displayed proximate to the displayed modification.

21 Claims, 12 Drawing Sheets

BLOCK DIAGRAM CHANGE HISTORY

COLOR DRAWINGS

The patent or application file contains at least one drawing executed in color. Copies of this patent or patent application publication with color drawing(s) will be provided by the Office upon request and payment of the necessary fee.

BACKGROUND

Computer-implemented block diagrams, such as graphical block based diagrams, may be generated with tools, for example, via numerical simulation. Block diagrams may be created, edited, and executed within a computing system. When a change is made to a block diagram, it may be desirable to keep track of why the change was made. Typically, the reason for the change is logged separately from the block diagram, for example, in a word processing document. In addition, the block diagram including the changes may be saved into a new file. In conventional systems, each change to the block diagram may produce a new file.

Saving each change into a new file may result in several files, each holding a different version of the block diagram. Typically, the only interrelation between the different versions of the block diagram may be a file name, which may annotate which version of the block diagram is stored in the particular file. To view differences between the different versions of a block diagram, a user typically needs to open two of the different versions in separate editing windows and visually inspect each version to determine the differences. In some situations, these differences may not be accompanied by an explanation of the reasons for the change or how the changes impact the respective versions. Therefore, the user may need to execute each version of the block diagram to determine the effect of the changes. The user may then compare results of each executed version to determine how a change affects the functionality of the block diagram. This conventional process may be time consuming, cumbersome, and prone to errors, especially with complex models or models having numerous changes.

BRIEF DESCRIPTION OF THE DRAWINGS

The foregoing and other features of the application will be apparent from the following, more particular description of embodiments, as illustrated in the accompanying drawings wherein like reference numbers generally indicate identical, functionally similar, and/or structurally similar elements.

DETAILED DESCRIPTION

While examples of embodiments are discussed below, it should be understood that this is done for illustration purposes only. In describing and illustrating the embodiments, specific terminology is employed for the sake of clarity. However, the application is not intended to be limited to the specific terminology so selected. A person skilled in the relevant art will recognize that other components and/or configurations may be used without departing from the spirit and scope of the application. It is to be understood that each specific element includes all technical equivalents that operate in a similar manner to accomplish a similar purpose. The examples and embodiments described herein are non-limiting examples.

As described in detail below, when one or more blocks of a block diagram are modified, comments may be received explaining why a particular modification is performed. Comments may be displayed near the modified block or in a separate location.

Figure 1:
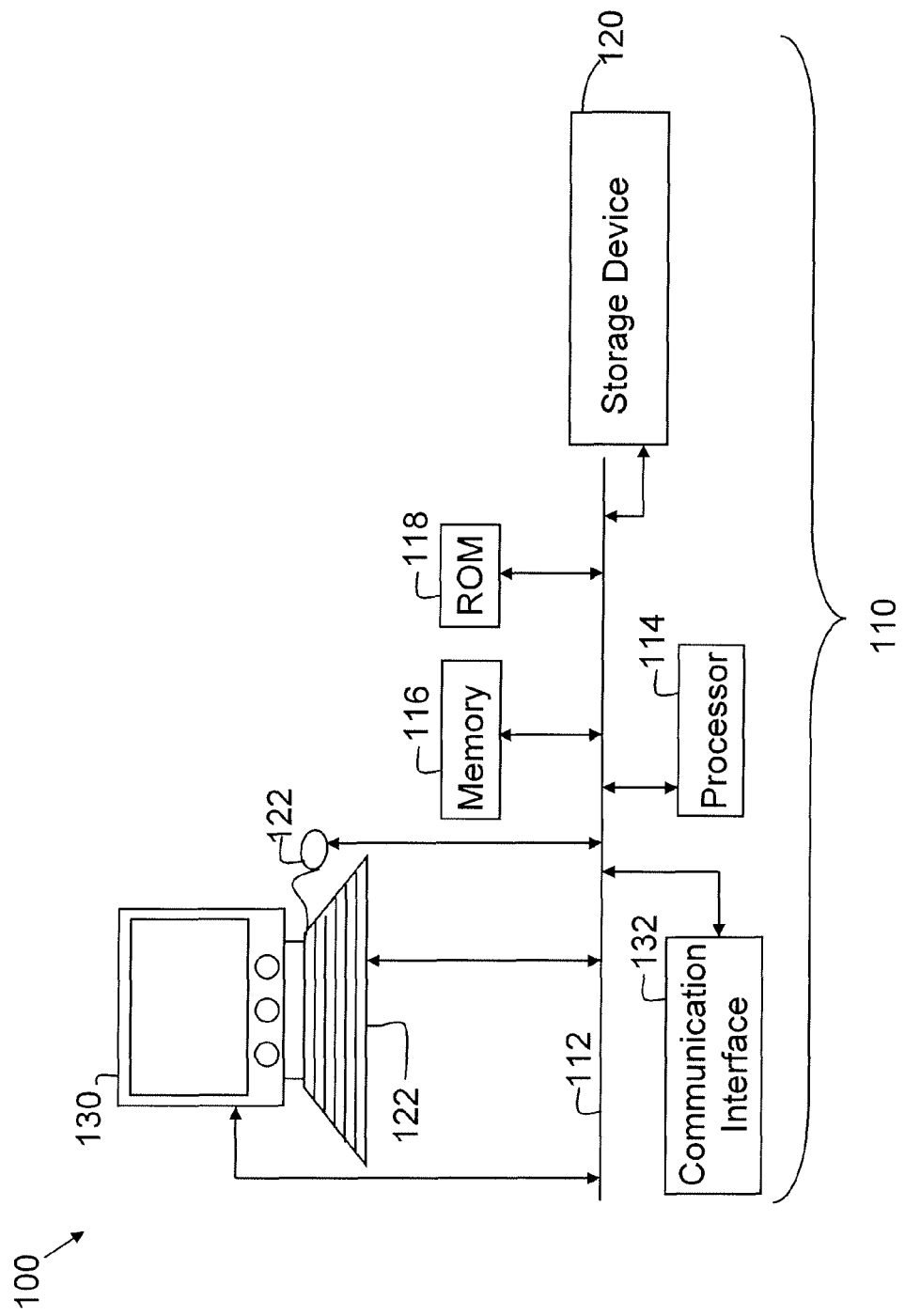
FIG. 1 is a diagrammatic illustration of a computer system.

With reference to FIG. 1, a computer system 100 may include a computer 110 that includes a bus 112, a processor 114, a memory 116, a read only memory (ROM) 118, a storage device 120, an input device 122, an output device 130, and a communication interface 132. Computer 110 may include a device that executes instructions to perform an operation. Computer 110 may include a personal computer, a laptop, a server, a personal digital assistant, a web appliance, or another type of device that processes instructions.

The bus 112 may include one or more interconnects that permit communication among the components of the computer 110. The processor 114 may include any type of processor, microprocessor, multi-core processor, or processing logic that may interpret and execute instructions. For example, processing logic may include devices such as field programmable gate arrays (FPGAs), etc. The memory 116 may include a computer readable medium, such as a random access memory (RAM) or another type of dynamic storage device that may store information and/or instructions for execution by the processor 114. The memory 116 may also be used to store temporary variables or other intermediate information during execution of instructions by the processor 114.

The computer 110 may perform certain functions in response to the processor 114 executing software instructions included in the computer-readable medium, such as memory 116. The computer-readable medium may include one or more memory devices (e.g., a distributed arrangement of memory devices). In alternative embodiments, hardwired circuitry may be used in place of or in combination with software instructions. Thus, implementations consistent with principles of the application are not limited to any specific combination of hardware circuitry and software.

The ROM 118 may include a ROM device and/or another type of static storage device that may store static information and instructions for the processor 114. The storage device 120 may include a magnetic disk and/or optical disk and its corresponding drive for storing information and/or instructions. The storage device 120 may include a single storage device or multiple storage devices, such as multiple storage devices operating in parallel. Moreover, the storage device 120 may reside locally on the computer 110 and/or may be remote with respect to the computer 110 and connected thereto via a network and/or another type of connection, such as a dedicated link or channel.

The input device 122 may include a mechanism or combination of mechanisms that permit an operator or user to input information to the computer 110, such as a keyboard, a mouse, accelerometer and gyroscope based input devices, neuro-based interface devices, a touch sensitive display device, a microphone, a pen-based pointing device, and/or a biometric input device, such as a voice recognition device and/or a finger print scanning device.

The output device 130 may include a mechanism or combination of mechanisms that outputs information to the operator, including a display, a printer, a speaker, etc.

The communication interface 132 may include any transceiver like mechanism that enables the computer 110 to communicate with other devices and/or systems, such as remote computers. For example, the communication interface 132 may include one or more interfaces. Alternatively, the communication interface 132 may include other mechanisms for communicating via a network, such as a wireless network. In one implementation, the communication interface 132 may include logic to send code to a destination device, such as a target device that may include general purpose hardware (e.g., a personal computer form factor), dedicated hardware (e.g., a digital signal processing (DSP) device or a field programmable gate array (FPGA), etc.

Figure 2:
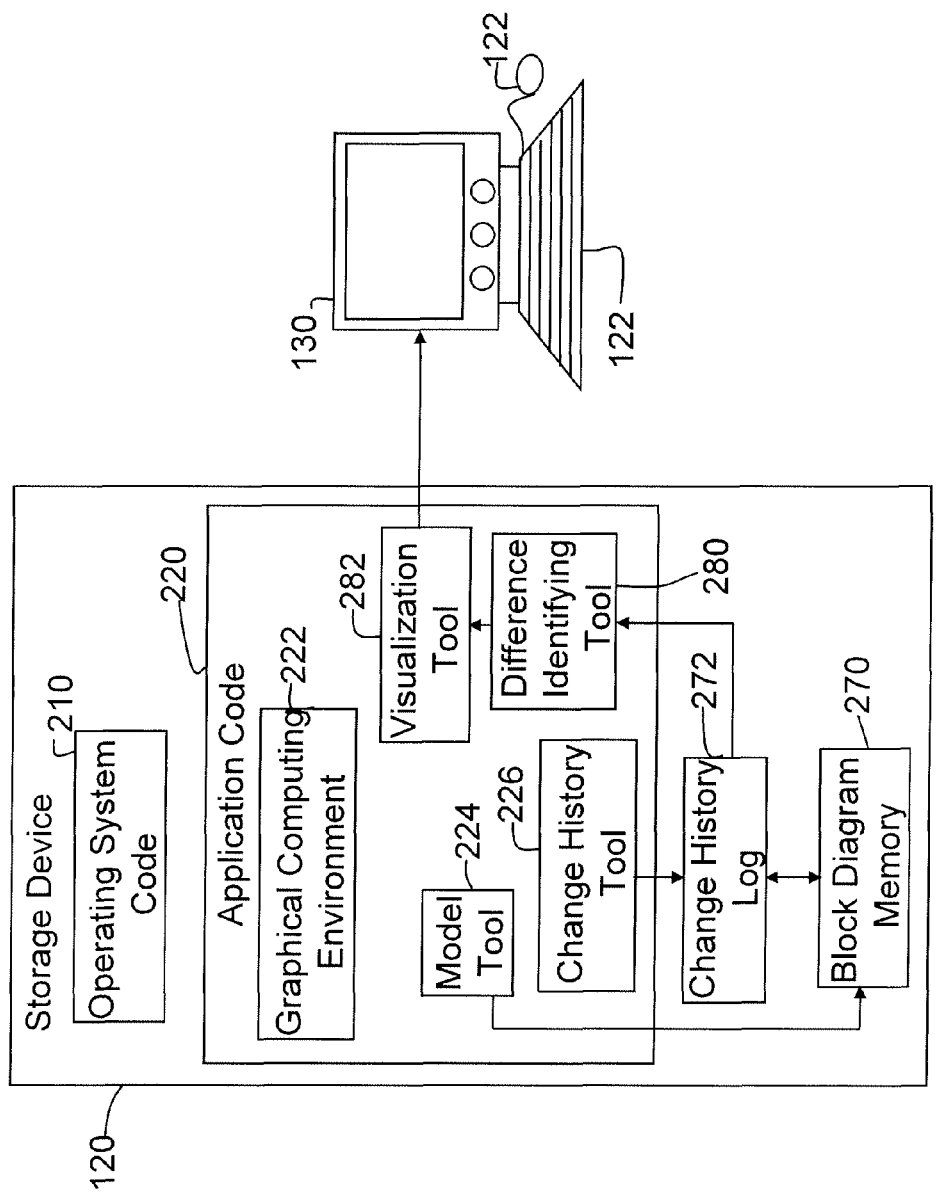
FIG. 2 is a diagrammatic illustration of the storage device of the computer system illustrated in FIG. 1.

FIG. 2 illustrates the storage device 120 of FIG. 1 in greater detail. The storage device 120 may include an operating system (OS) code 210 of the computer 110, an application code 220 for applications running on the operation system, a block diagram memory 270 and a change history log 272. The application code 220 may include a graphical or graphics-based computing environment 222, a model tool 224, a change history tool 226, a difference identifying tool 280 and a visualization tool 282.

As discussed in detail below, the model tool 224 may be used to create, modify or execute a model or a block diagram. Different revisions of the block diagram may be saved in the block diagram memory 270. The change history tool 226 may be used to generate records reflecting the history of modifications of the block diagram which may be stored in the change history log 272. The difference identifying tool 280 may be used to compare selected revisions of the block diagram to identify or retrieve differences of the selected revisions. The visualization tool 282 may place the identified differences into a format that may be displayed on the output device 130.

For example, a modification or a change to one or more elements of the block diagram may be received from a user via the input device 122. The user may also enter a commentary or comment regarding one or more properties or characteristics of the modification.

The modified or revised block diagrams may be saved in the block diagram memory 270. In an embodiment, each modified or revised block diagram may be saved as a next revision. For example, a user may be working in version 1.0 of a block diagram. Revisions made to version 1.0 may be saved into a next revision of the block diagram denoted as version 2.0 of the block diagram in the block diagram memory 270. Change entries with associated commentaries may be associated with corresponding revisions of the block diagram and saved in the change history log 272. In an embodiment, each change entry with the associated commentary may be associated with a corresponding revision of the block diagram and saved in the change history log 272. The difference identifying tool 280 may compare the selected revisions to determine differences between different revisions of the block diagram. The revision may be selected, for example, by the user. The visualization tool 282 may determine how to display the identified differences for the selected revisions so that the differences may be presented to the user. For example, the visualization tool 282 may select indications for displaying the differences so that the differences are distinguished from one another. For example, the displayed differences may be distinguished from one another at least by one of a color or a line width. The change entries, associated with the selected revision and related to the identified difference, may be displayed in proximity to the visualized difference on the output device 130. For example, the change entries may be displayed in a transparent window or a floating window close to the difference on the output device 130.

Figure 3:
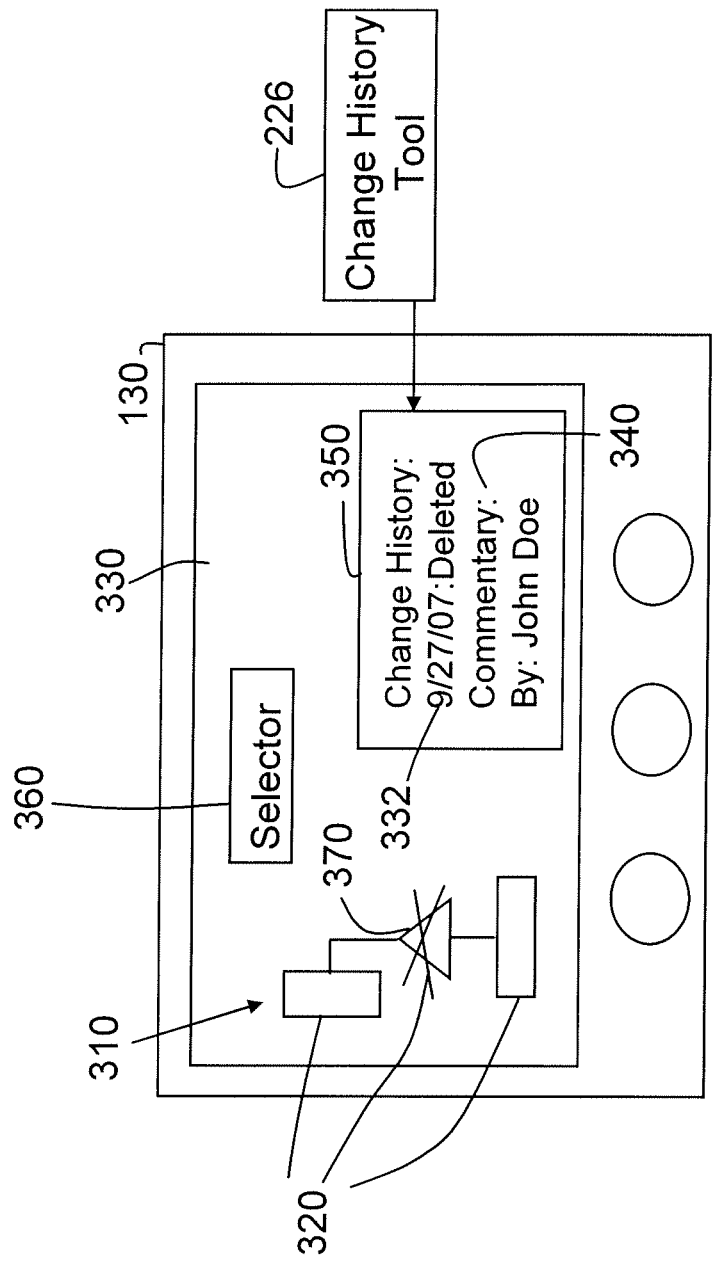
FIG. 3 is a diagrammatic illustration of the output device of the computer system illustrated in FIG. 1.

FIG. 3 illustrates the output device 130 of FIG. 1 in greater detail. In FIG. 3, output device 130 may display a graphical computing environment user interface screen or screens 330. User interface 330 may display a block diagram 310, a change history window 350 and a selector window or switch 360 on the user interface screen 330.

Block diagram 310 may include a plurality of elements or blocks 320. For example, block diagram 310 may represent a control system and may include elements 320 that represent control system components, such as amplifiers, feedback blocks, integrators, switches, signal sources, etc.

User interface screen 330 may display a change entry or entries 332 and/or a commentary 340 via the change history window 350. Change history window 350 may display a change entry 332 for a deleted element 370. Change history window 350 may also display one or more comments associated with the change via commentary 340.

The selector switch 360 may be used to provide, receive and/or enter a selection into user interface 330. For example, selector switch 360 may let a user select a particular revision, such as a deleted element, a version of block diagram 310, etc.

As an example, referring back to FIG. 3, the block diagram 310 may be revised by adding, deleting or modifying elements of the block diagram 310, such as the elements 320, via the user interface screen 330. For example, each element 320 may be edited separately from the other elements of the block diagram 310. For example, a user may delete one of the elements 320 in block diagram 310, e.g., the user may delete an element 370. The elements 320 of the block diagram 310 may have settings.

Continuing with the example, the change history tool 226 may simultaneously create the change entry 332 while the block diagram 310 is being modified. For example, the change entry may be entered by a user via the input device 122. The change entry 332 may be associated with the commentary 340 related to the modification of the block diagram 310. The change history tool 226 may provide one or more change entries and commentary 340 to be displayed in the change history window 350. For example, the change entry, associated with the selected revision and related to the identified difference, may be displayed in the change history window 350, proximate to the displayed difference on the output device 130. For example, the deletion of an element 370 may be indicated by displaying two intersecting lines superimposed over the element 370.

It is contemplated that a hyperlink to a change record may be provided in place or in addition to the change history window.

Figure 4:
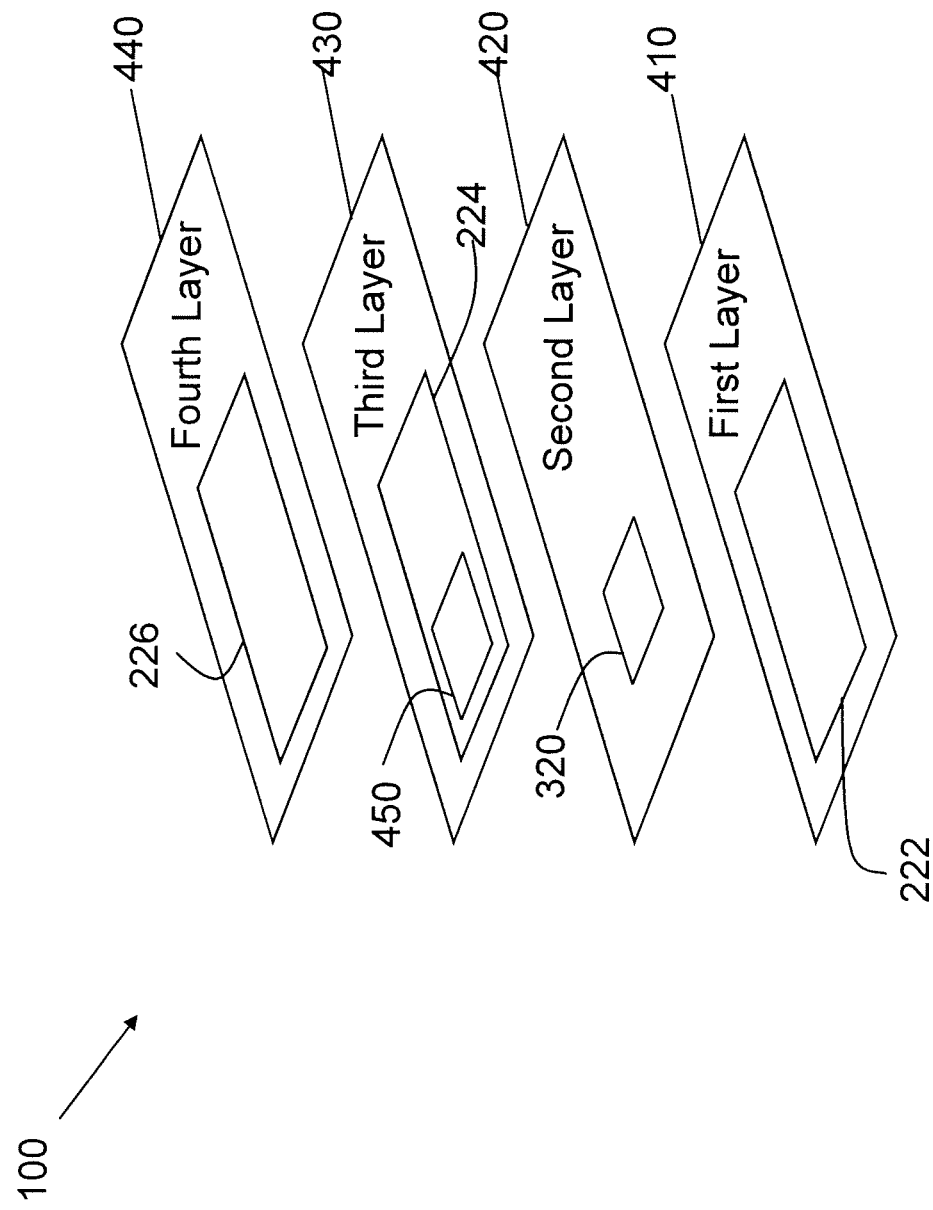
FIG. 4 is a diagrammatic illustration of multiple computing layers.

FIG. 4 is an illustration of an example of multiple computing layers. For example, the computer system 100 may include multiple computing layers such as, for example, first, second third and fourth computing layers 410, 420, 430 and 440. A layer may be an abstract component which may provide certain functionality in the computer system 100. For example, the first layer 410 may include the graphical computing environment 222. The second layer 420 may be a transformation layer. The third layer 430 may include the model tool 224. The fourth layer 440 may include the change history tool 226. A layer may have one or more cutout windows, such as a window 450 in the third layer 430. The transformation layer 420 may transform the element 320 of the block diagram 310 as the element 320 passes through the transformation layer 420 and into the first layer 410.

In an embodiment, a layer may be added in between existing layers. Further, the order of two or more layers may be switched. One or more layers may be switched to an on- or off-state. For example, the fourth layer 440 may be turned off so the computer system 100 may stop record change history.

The layered system may allow a change inside one layer without impacting other layers. For example, the change history tool 226 which may reside on the fourth layer 440 may work with different kinds of graphical computing environments 222 which may reside on the first layer 410. A layer may be locked to prevent changes to the layer, or unlocked to allow changes to the layer.

Figure 5:
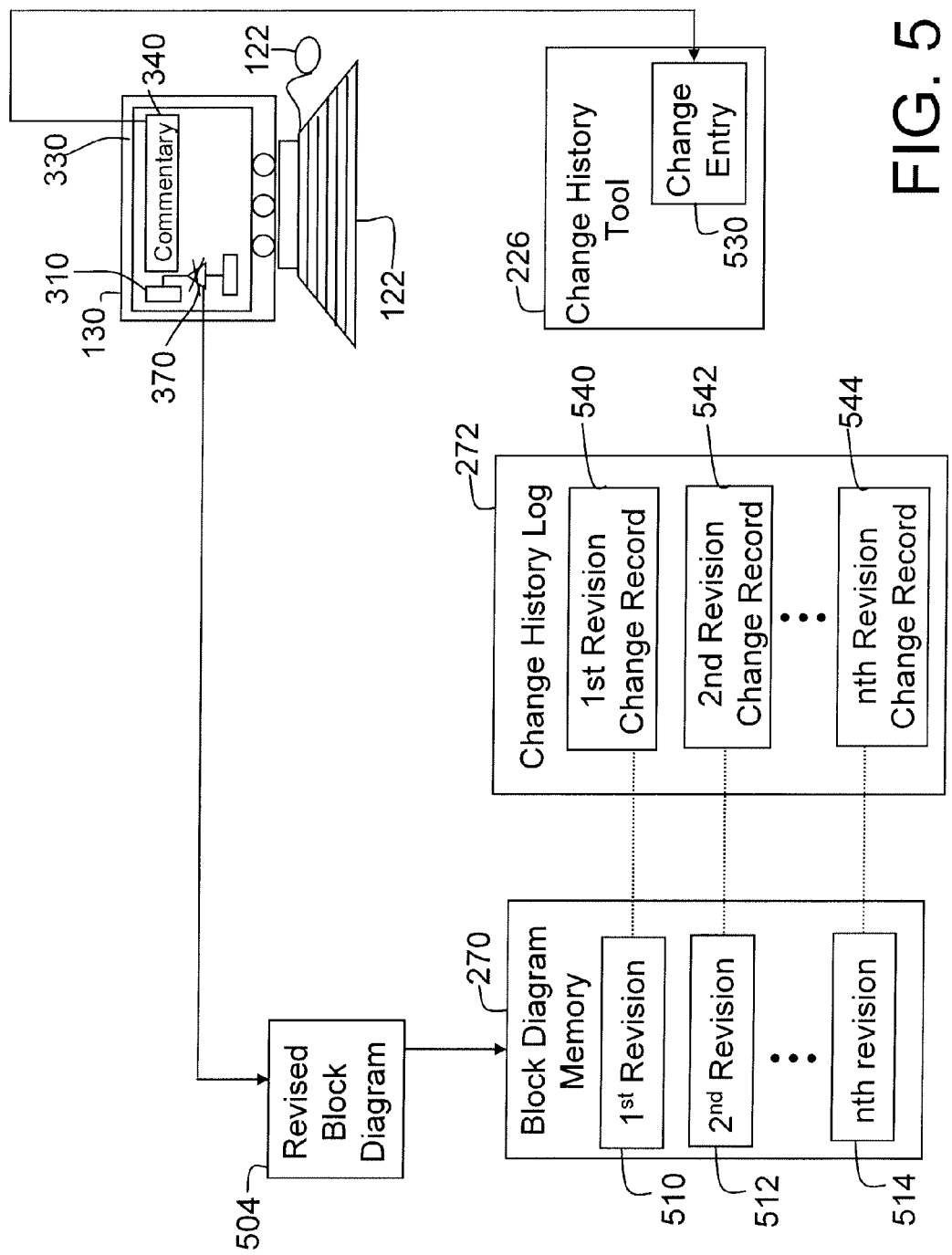
FIG. 5 is a diagrammatic illustration of a detailed portion of a computer system.

FIG. 5 illustrates an embodiment of FIG. 2 in greater detail. The embodiment of FIG. 5 may include the output device 130, the change history tool 226, a revised block diagram 504, the block diagram memory 270 and the change history log 272. For example, the block diagram change may be received from a user via the input device 122 and displayed on the output device 130. The block diagram change may be a modification to the block diagram 310, such as, a deletion of the element 370 from the block diagram 310 to produce the revised block diagram 504.

Alternatively, the block diagram change may be, for example, an addition of a new element to the block diagram 310 at a specified position, a position change of the element within the block diagram 310, a change of a setting for the element in the block diagram 310, etc. The block diagram memory 270 may store a first, second, . . . , nth revision 510, 512, . . . , 514, respectively, of the block diagram 310 when changes are made.

The commentary 340 related to the deletion of the element 370 from the block diagram 310 may be received from the user via the input device 122. The change history tool 226 may associate each block diagram change with the commentary 340 to form a change entry or entries 530. Change entries 530 may include data such as, for example, the date and/or time at which a block diagram change is applied to the block diagram 310. Alternatively, change entries 530 may identify when commentary 340 is received, e.g., received from a user. Change entries 530 related to a corresponding block diagram revision may be associated with the corresponding block diagram revision and stored in the change history log 272. For example, change entries 530 may be stored as a first revision change record, second revision change record, . . . , nth revision change record 540, 542, . . . , 544, respectively. In an embodiment, the revision change records 540, 542, . . . , 544 may be stored according to a parameter or format. For example, revision change records may be stored in a chronological order, a reverse chronological order, or another order that may be user specified and/or specified by the system (e.g., automatically specified by the system on behalf of a user), etc.

The commentary 340 may include one or more of text (letters, numbers, symbols, etc.), audio, images, video segments, etc. For example, the commentary 340 may be text and/or a video clip that describes why the block diagram change was made.

In an embodiment, the block diagram change and commentary 340 may be received from, for example, another computer connected to the computer 110 over a network.

Figure 6:
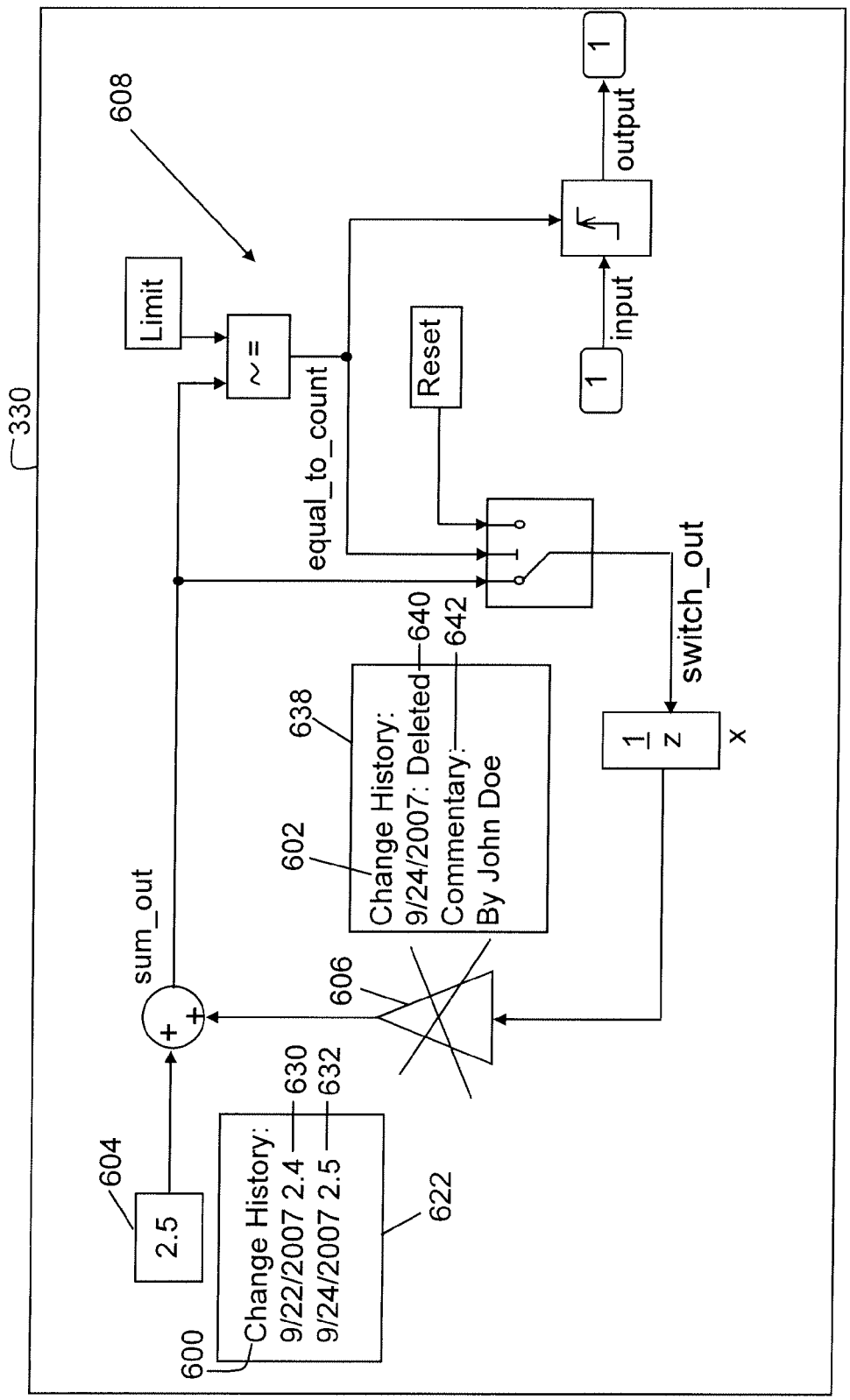
FIG. 6 is a diagrammatic illustration of a user interface.

With reference to FIG. 6, an example of a user interface screen 330 is illustrated. The user interface screen 330 may include a block diagram 608, a first change history window 622 and a second change history window 638. The block diagram 608 may include a first element 604 and a second element 606 which have been or are being modified.

A first change history 600 may be displayed for the first element 604 in the first change history window 622 and may include a first change entry 630 and a second change entry 632. The first change entry 630 may indicate that a value of a parameter or a setting in the first element 604 was entered, changed or modified on a particular date For example, the first change entry 630 may indicate that a value was change to 2.4 on Sep. 22, 2007. For example, the original value may be displayed in bold to illustrate for the user a starting point for the subsequent revisions. The second change entry 632 may indicate that a value of the parameter in the first element 604 was changed on another date, such as Sep. 24, 2007, to 2.5. As illustrated, the value of 2.5 of the first element 604 is the current parameter value for the block diagram 608.

The second change history 602 for the second element 606 may be displayed in the second change history window 638 and may include a third change entry 640 and a commentary 642. The third change entry 640 may indicate that the second element 606 has been deleted on a particular date, such as Sep. 24, 2007. The commentary 642 may indicate that the deletion has been made by John Doe.

For example, the first and second change history windows 622, 638 may be displayed proximate to the visual indication of a corresponding modified element 604, 606 of the block diagram 608. Optionally, the change history including the commentary may be displayed in a separate window or area of the output device 130 or on a separate computer.

Figure 7:
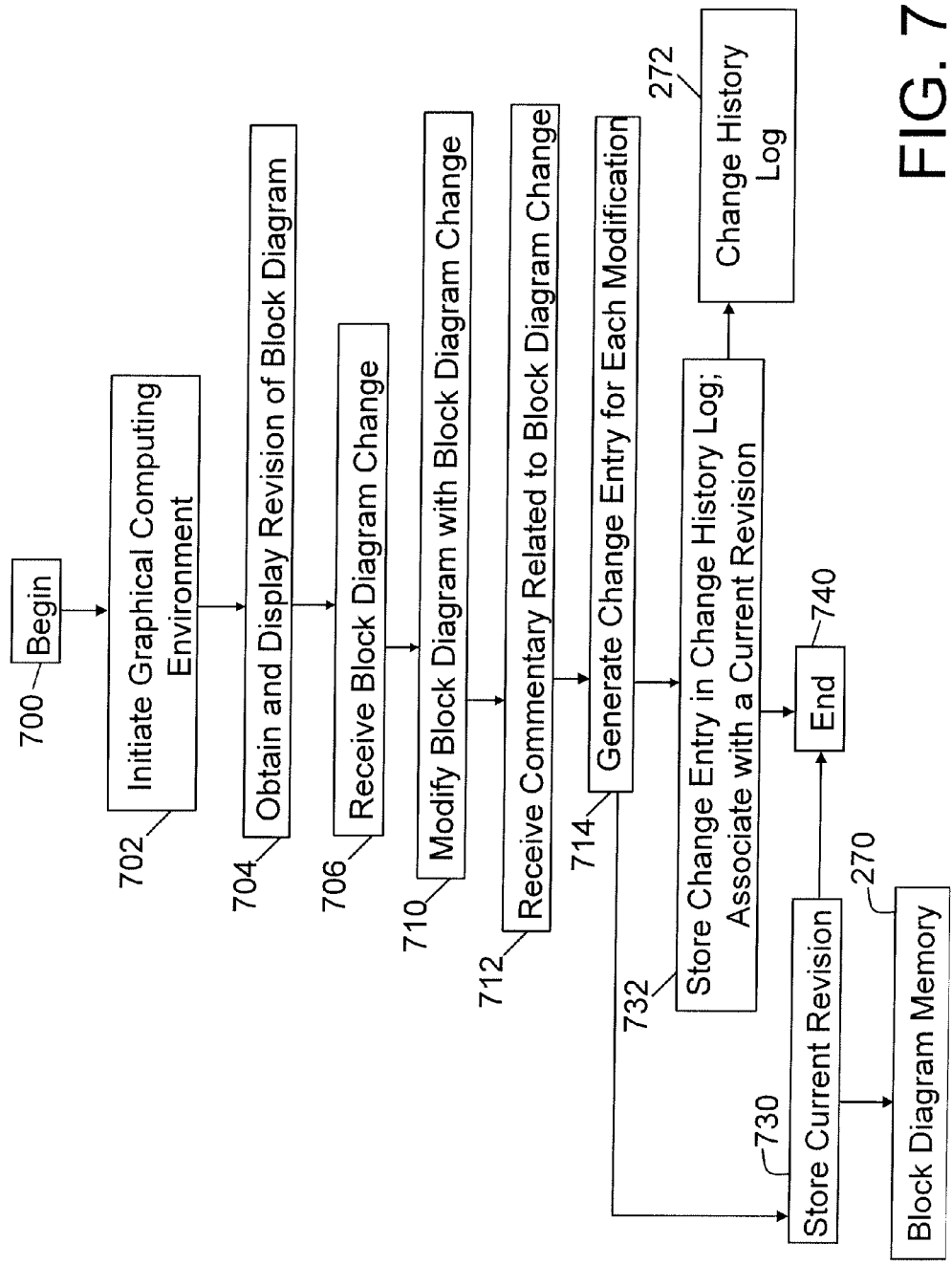
FIG. 7 is a flowchart illustrating processing for creating a change history record including a commentary.

With reference to FIG. 7, a flowchart of a process for creating a change history record including a commentary is illustrated. In block 700, the flowchart begins. In block 702, the graphical computing environment 222 may be initiated. For example, the graphical computing environment 222 may be initiated automatically or by a user. In block 704, a revision of the block diagram 310, 608, such as the first revision 510, may be obtained and displayed on the output device 130. In block 706, the block diagram change, such as a deletion or insertion of the element, may be received. For example, a delete or insert operation may be performed on an element of the block diagram. In block 710, the block diagram 310 may be modified to generate the modified block diagram 504.

In block 712, the commentary 340, 642 corresponding to the block diagram change may be received. The commentary may be, for example, provided by a user or generated by a system. Optionally, the commentary 340, 642 may be requested from a user. For example, a commentary window may appear on the user interface screen 330 when the block diagram change has been applied to the block diagram 310, or the commentary window may appear on the output device 130 as a separate window, outside of the user interface screen 330.

In block 714, the change entries 530, 630, 632, 640 may be generated. Each generated change entry 530, 630, 632, 640 may be associated with a corresponding modification of the currently edited element 320, 370, 604, 606 of the block diagram 310, 608 and the commentary 340, 642. In block 730, the revised block diagram 504 may be stored in the block diagram memory 270 as a next revision of the block diagram. For example, the revised block diagram 504 may be stored in the block diagram memory 270 as, for example, the second revision 512 of the block diagram 310, 608. In block 732, the change entries 530, 630, 632, 640 may be associated with the second revision 512 and stored in the change history log 272 as the second revision change record 542. In block 740, the flowchart ends.

Figure 8:
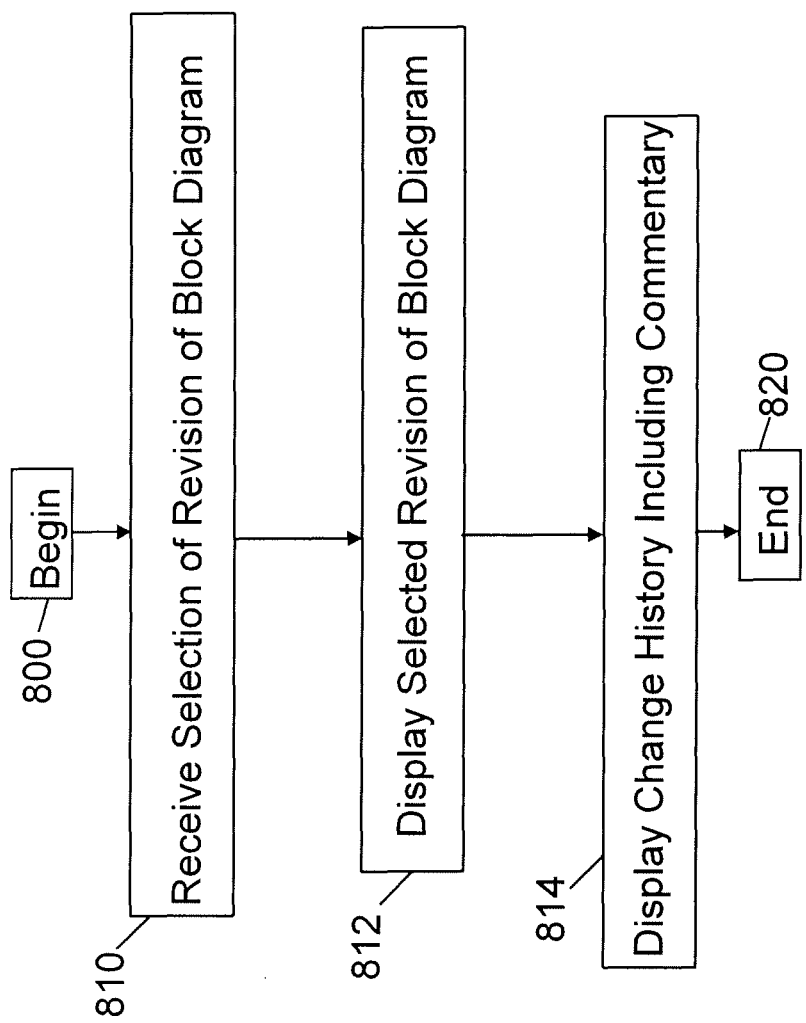
FIG. 8 is a flowchart illustrating processing for displaying a change history.

With reference to FIG. 8, a flowchart of a process for displaying a change history is illustrated. In block 800, the flowchart begins. In block 810, a revision of the block diagram 310, 608, such as, for example, the first revision 510 may be selected. The selection may be made automatically and/or by a user. For example, the selection may be received from a user via the selector switch 360. In block 812, the selected revision 510 of the block diagram 310, 608 may be displayed on the output device 130. In block 814, the change history 600, 602 for the modified element 320, 370, 604, 606 may be displayed. The commentary 340, 642, associated with one or more change entries 332, 530, 630, 632, 640 may also be displayed. In block 820, the flowchart ends.

Figure 9:
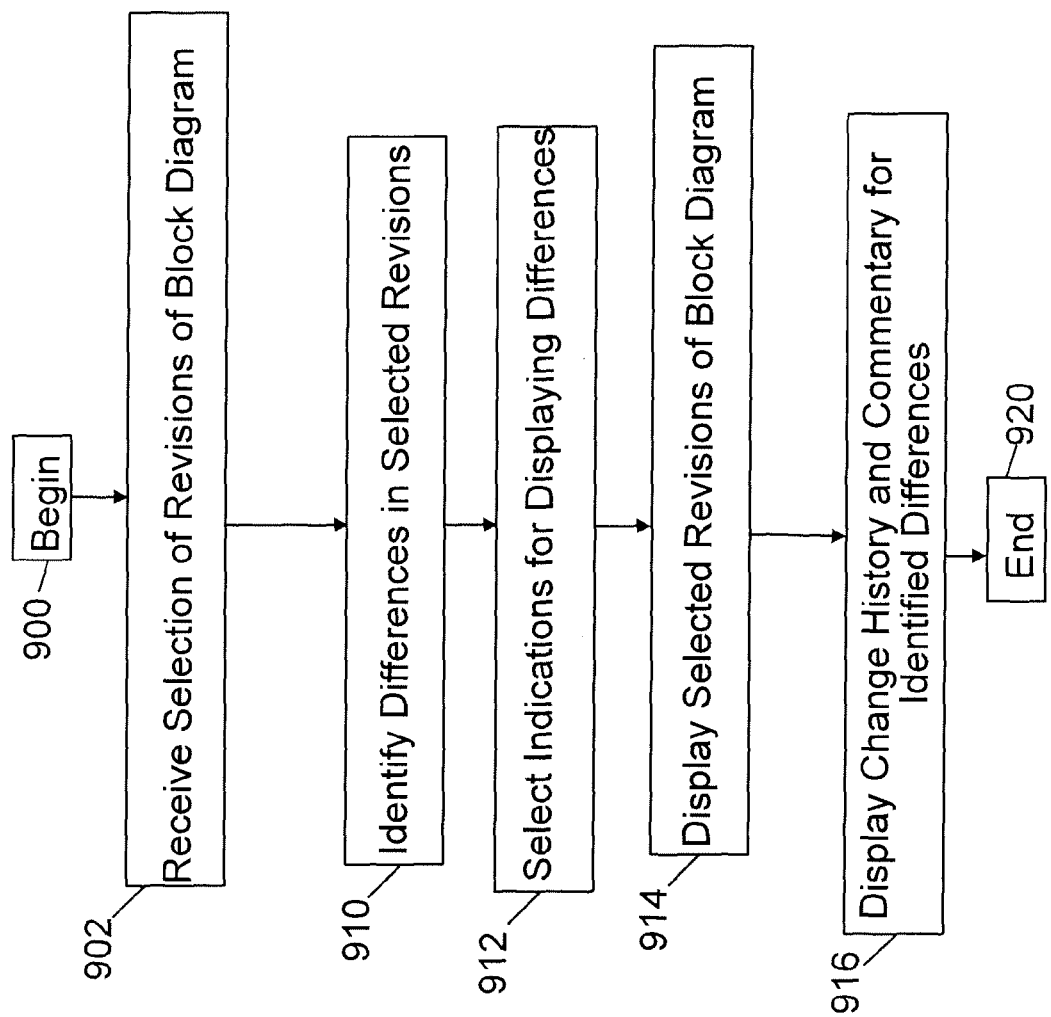
FIG. 9 is a flowchart illustrating processing for displaying and visualizing a change history for different revisions of a block diagram.

With reference to FIG. 9, a flowchart of a process for displaying and visualizing a change history for different revisions of the block diagram is illustrated. For example, different revisions 510, 512, . . . , 514 of the block diagram 310, 608 may be displayed concurrently. In block 900, the flowchart begins. In block 902, a selection of revisions of the block diagram 310, 608 may be received. The selection may be made automatically and/or by a user. For example, the selection may be received from a user via the selector switch 360. For example, the first and second revisions 510, 512 of the block diagram 310, 608 may be selected.

In block 910, the selected revisions 510, 512 may be compared to identify differences. For example, the change history log 272 may be used to identify differences. For example, parameters of the common elements may be compared, elements that are uncommon to the selected revisions may be identified, etc. In block 912, an indication or indications for displaying the identified differences between the first and second revisions 510, 512 may be selected. For example, the differences between the displayed first and second revisions 510, 512 of the block diagram 310, 608 may be distinguished by, for example, different colorings, textures, line widths, line types, background shading for commonalties and/or differences, etc. Embodiments may use other techniques that allow items to be visually and/or audibly differentiated may be used, e.g., flashing, audio, etc. The selection may be made automatically and/or by a user. The selection may be the same or different for different types of differences.

In block 914, the selected revisions of the block diagram 310, 608 with the visualized differences may be displayed concurrently on the output device 130. The first and second revisions 510, 512 of the block diagram 310, 608 may optionally be displayed in a layered fashion, e.g., on a separate electronic layer within the graphical computing environment 222. For example, the first revision 510 may be displayed on a transparent window/layer overlay contemporaneously with the second revision 512.

In block 916, the change history 600, 602 including the commentary 340, 642 may be displayed in the change history window 350, 622, 638. For example, the change history window 350, 622, 638 may be displayed proximate to the visual indication of the change to the block diagram 310, 608. Optionally, the change history 600, 602 including the commentary 340, 642 may be displayed in a separate window or area of the display, or on a separate computer. In an embodiment, a different number of revisions of the block diagram 310, 608 may be displayed, such as, for example, one, three, four, etc. In block 920, the flowchart ends.

Figure 10:
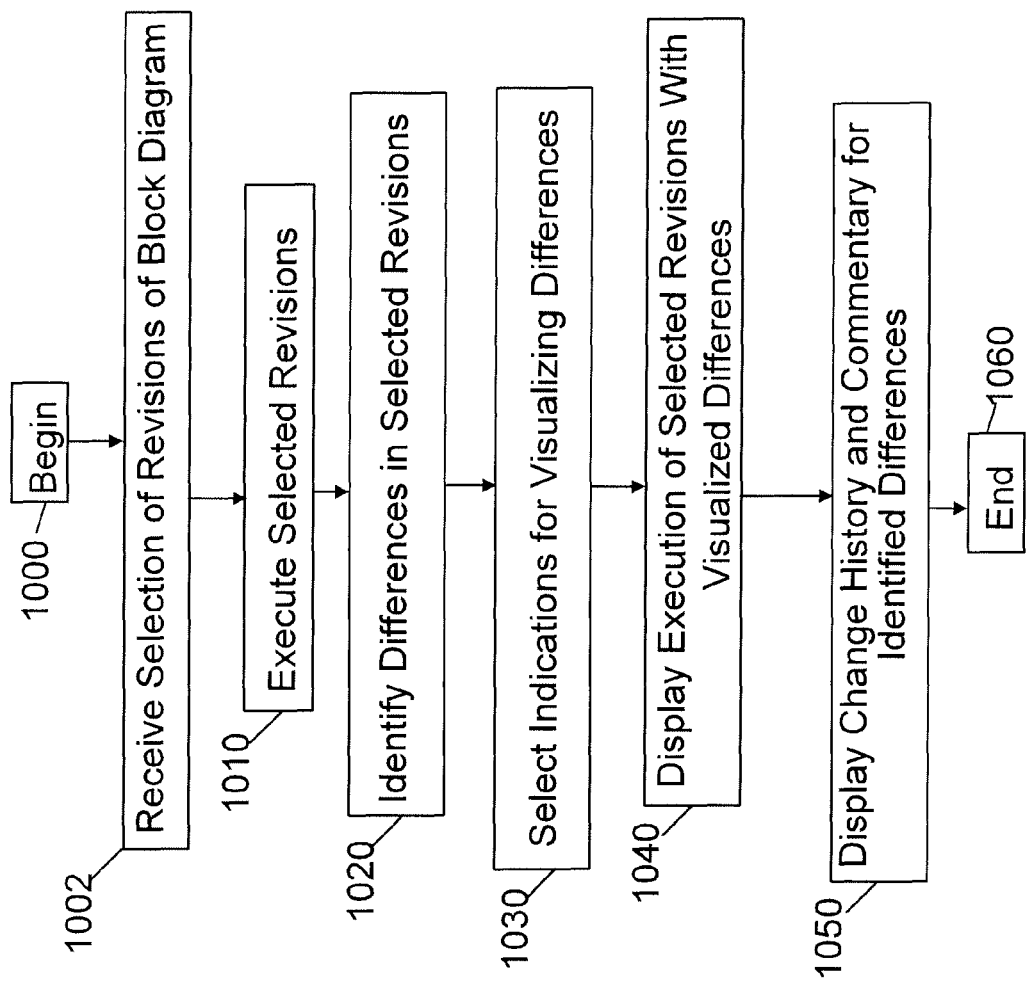
FIG. 10 is a flowchart illustrating processing for displaying and visualizing the execution of different revisions of a block diagram.

With reference to FIG. 10, a flowchart for displaying and visualizing the execution of different revisions of the block diagrams is illustrated. For example, two or more revisions 510, 512, . . . , 514 of the block diagram 310, 608 may be executed concurrently on the output device 130. In block 1000, the flowchart begins. In block 1002, information about revisions of the block diagram 310, 608 may be received. For example, the first and second revisions 510, 512 of the block diagram 310, 608 may be selected for execution. In block 1010, the first and second revisions 510, 512 may be executed, for example, in a layered fashion. In block 1020, results of the execution of the revisions 510, 512 may be compared to one another to identify differences. In block 1030, an indication or indications for displaying the identified differences between the results of the execution of the first and second revisions 510, 512 may be selected.

In block 1040, the results of the execution of the revisions 510, 512 of the block diagram 310, 608 with the visualized differences may be displayed concurrently on the output device 130. For example, the results of the execution of the selected revisions 510, 512 of the block diagram 310, 608 may be displayed side by side on the user interface screen 330. Differences between executed diagrams may include, for example, differences between the results of the execution for one of the elements 320, 370, 604, 606 common between the selected revisions, differences between information flow, instances where the elements 320, 370, 604, 606 are not common between the selected revisions, and/or differences in the final result or output of the selected revisions, etc. The differences in execution may be visibly distinguished in any manner suitable for a viewer to differentiate between the executed revisions of the block diagram 310, 608. In an embodiment, the differences may also be broken out.

In block 1050, the available change history 600, 602 including the commentary 340, 642, if available, may be displayed in the change history window 350, 622, 638 for the visualized and displayed differences. In block 1060, the flowchart ends.

In an embodiment, a different number of revisions of the block diagram may be selected for execution such as, for example, one, three, four, or other.

Figure 11:
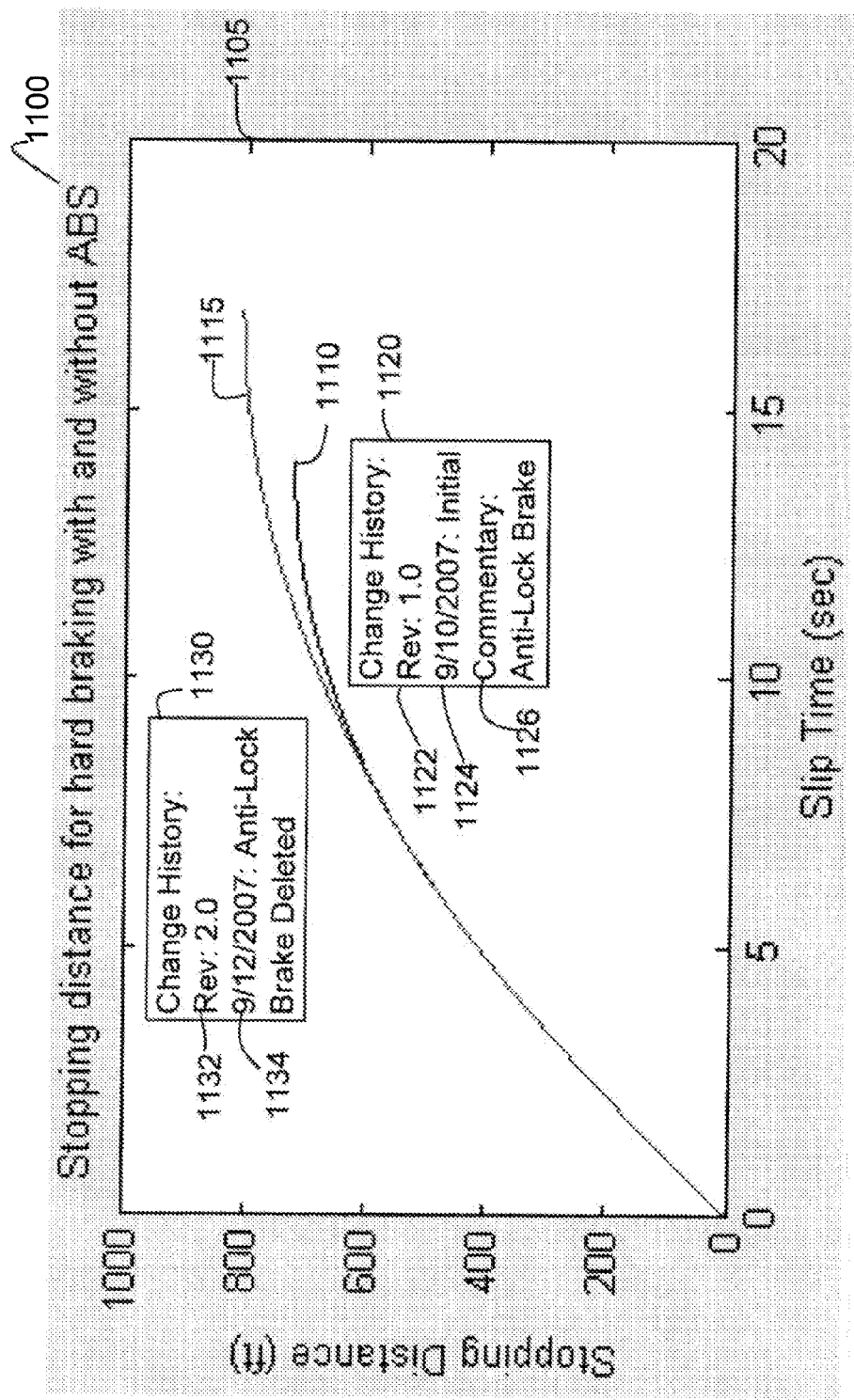
FIG. 11 illustrates an example window for displaying results from an execution of different revisions of the block diagram.

FIG. 11 illustrates an example window displaying an execution of different revisions of a block diagram. The window 1100 may include a graph 1105, a first graphical result 1110 and a second graphical result 1115. The different revisions may be the first and second revisions 510 and 512 of the block diagram 310 executed side by side on the separate window 1100 of the output device 130. The execution results may be overlaid in the same graph 1105 for an easy visual comparison. The first graphical result 1100 may illustrate a dependency of a stopping distance on stopping time for a model which may include an anti lock braking system. A first change history window 1120 may be displayed in a proximity to the first graphical result 1110. The first change history window 1120 may include a first change entry 1122, a second change entry 1124 and a commentary 1126. The first change entry 1122 may be a record indicating that the first graphical result 1110 corresponds to a revision 1.0. The second change entry 1124 may be a record indicating that revision 1.0 was created on Sep. 10, 2007 and is an initial revision. The commentary 1126 may be a record indicating that the revision 1.0 corresponds to a system including anti-lock brakes. The second graphical result 1115 may illustrate a dependency of a stopping distance on stopping time for a model which does not include an anti lock braking system. A second change history window 1130 may be displayed in a proximity to the second graphical result 1115. The second change history window 1130 may include a third change entry 1132 and a fourth change entry 1134. The third change entry 1132 may be a record indicating that the second graphical result 1115 corresponds to a revision 2.0. The fourth change entry 1134 may be a record indicating that revision 2.0 was created on Sep. 12, 2007 and that the anti-lock brakes option was deleted.

It is contemplated that a user may revert to the previous changes on the diagram and in the dialog windows. Further, a user may have an option to decide which types of changes to track. E.g., non-semantic, graphical only changes may be ignored. The systems and methods described herein may have the capabilities to go through the changes in a systematic way (next/previous) and have the capabilities to accept or reject changes.

Examples of the graphical computing environment 222 may include graphical computing environments such as a block-based SIMULINK® environment and a chart-based STATEFLOW® environment by The MathWorks, Inc. of Natick, Mass. SIMULINK® and STATEFLOW® environments are software packages that enable the user to model, simulate, and analyze systems whose outputs change over time using the block diagrams or charts. Such systems are often referred to as dynamic systems. SIMULINK® and STATEFLOW® software packages may be used to explore the behavior of a wide range of real-world dynamic systems, including electrical circuits, shock absorbers, braking systems, and many other electrical, mechanical, fluid, thermodynamic, quantum and biological/life systems. Block diagrams and charts are graphical entities having an "executable meaning" that are created within the computing environment for computing a dynamic system, and generally comprise one or more graphical objects.

For example, a block diagram model of a dynamic system may be represented schematically in a SIMULINK® software package as a first collection of graphical objects, such as nodes, that are interconnected by another set of graphical objects, generally illustrated as lines, which represent logical or physical connections or decision/process flow between the first collection of graphical objects. The line segments are often referred to as "signals". Signals correspond to the time-varying quantities represented by each line connection and have values at each time instant and are not electromagnetic signals. A signal may be read from a location and stored at another location. Each node may represent an elemental dynamic system, component or algorithm, and the relationships between signals and state variables may be defined by computations, sets of equations, etc. represented by the nodes. Inherent in the definition of the relationship between the signals and the state variables is the notion of parameters, which are the coefficients of the equations. The equations define a relationship between the input signals, output signals, state, and time, so that each line represents the input and/or output of an associated elemental dynamic system. A line emanating at one node and terminating at another signifies that the output of the first node is an input to the second node. The source node of a signal writes to the signal at a given time instant when its system equations are solved. The destination nodes of this signal read from the signal when their system equations are being solved. Those skilled in the art will recognize that the term "nodes" does not refer exclusively to elemental dynamic systems but may also include other computing elements that aid in readability and modularity of block diagrams.

A STATEFLOW® software package may include STATEFLOW® charts that may include graphical diagrams used to capture behavior of reactive systems and processes. These charts may include data flow blocks that describe a graphical programming paradigm where the availability of data may be used to initiate the execution of blocks, where a block represents an operation and a line represents execution dependency describing the direction of data flowing between blocks. For example, in a model of a physical system, the blocks may represent physical entities such as gears, bodies, joints, pipes, etc., and the lines represent physical connection between the physical entities.

The techniques and embodiments described herein may be embodied in various user interfaces, graphical models, computing environment, and technical computing environments, including state-based and flow diagram environments, data flow diagram environments, entity flow network diagrams, electronic design automation (EDA) environments, Schematic Layout environments, and Unified Computing Language (UML) environments, such as those using software products of SIMBIOLOGY™ from The MathWorks, Inc. of Natick, Mass., LABVIEW® or MATRIX from National Instruments, Inc. of Austin, Tex., Virtuoso, Incisive, or Encounter from Cadence of San Jose, Calif., Dymola from Dynasim AB of Lund, Sweden, SystemView from Elanix of Norcross, Ga., MATHEMATICA® from Wolfram Research, Inc. of Champaign, Ill., MATHCAD® from Mathsoft Engineering & Education Inc. of Cambridge, Mass., MAPLE™ from Maplesoft, a division of Waterloo Maple Inc. of Waterloo, Ontario of Canada, GALAXY™ or DISCOVERY™ from Synopsis, Inc. of Mountain View, Calif., Design Architect, Questa, or Board Station from Mentor Graphics Corp. of Wilsonville, Oreg., Rose from International Business Machine Corporation of Armonk, N.Y., Rhapsody from I-Logix, Inc. of Andover, Mass., VISSIM™ from Visual Solutions, Inc. of Westford, Mass., or Artisan from Artisan Software Tools, Inc. of Beaverton, Oreg., etc.

Figure 12:
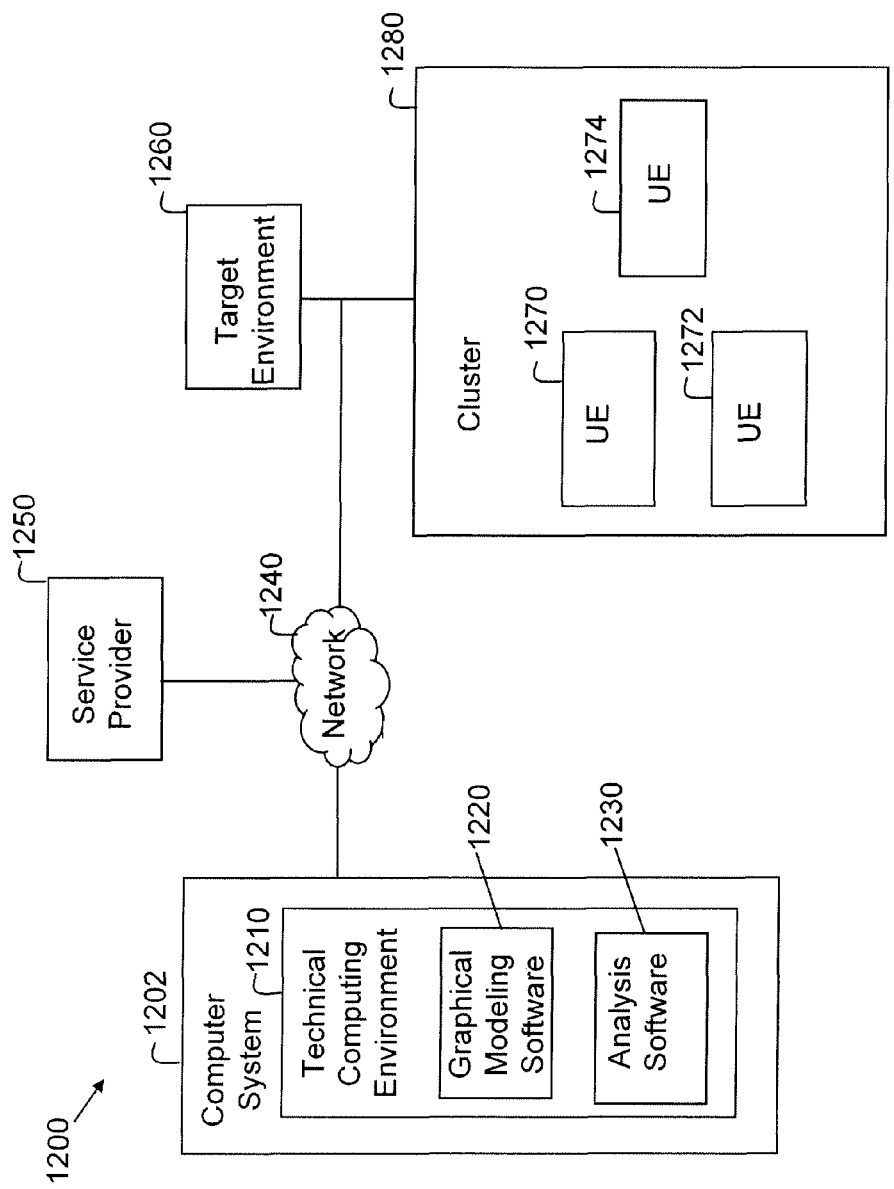
FIG. 12 illustrates an example of a distributed computing environment.

It should be noted that various environments may be configured to practice embodiments of the invention. For example, FIG. 12 illustrates an example of a distributed environment 1200 that may be configured to practice an embodiment of the invention. Referring to FIG. 12, environment 1200 may include a computer system 1202, network 1240, service provider 1250, target environment 1260 and cluster 1280. Note that the distributed environment illustrated in FIG. 12 is just one example of a distributed environment that may be used with the invention. Other distributed environments that may be used with the invention may include environments that contain additional devices, fewer devices, or devices in arrangements that differ from the arrangement of environment 1200.

Computer system 1202 may include a device capable of sending and/or receiving information (e.g., data) to and/or from another device, such as target environment 1260, respectively. Computer system 1202 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the computer system 1202 to perform one or more activities and/or generate one or more results. Information as used herein, may refer to any type of machine-readable information having substantially any format that may be adapted for use, e.g., in one or more networks and/or with one or more devices. The information may include digital information and/or analog information. The information may further be packetized and/or non-packetized.

In an embodiment, computer system 1202 may include a technical computing environment (TCE) 1210. The TCE 1210 may include a graphical block diagram environment that may be used to execute models and manipulate the models in accordance with techniques described herein. In different embodiments, computer system 1202 may include other components, applications, etc. The TCE 1210 may contain computer-executable instructions (e.g., code) and data that are configured to implement the TCE. The instructions may include instructions configured to implement modeling software 1220 and/or graphical analysis software 1230. The modeling software 1220 and the analysis software 1230 may be graphical, textual or a hybrid that includes both textual and graphical capabilities/features.

The modeling software 1220 may include computer-executable instructions that allow, e.g., a user to build and/or execute a model. For example, the modeling software 1220 may allow a user to build and execute a time-based model, a state-based model, an event-based model, a dataflow-based model, etc. In an embodiment, the modeling software 1220 may be implemented using the SIMULINK® software. SIMULINK® software is available from The MathWorks, Inc., of Natick, Mass.

The analysis software 1230 may include computer-executable instructions that allow information in a model to be evaluated. Evaluating a model may include generating tests for the model that satisfy model coverage and various objectives that may be user-defined. In addition, evaluating a model may include proving various model properties and generating examples of violations of these properties. Moreover, evaluating a model may include analyzing the model, in accordance with techniques described herein, to identify, rewrite and/or convert timers contained in the models. In an embodiment, analysis software 1230 may comprise the SIMULINK® Design Verifier software which is available from The MathWorks.

The network 1240 may include any network capable of exchanging information between entities associated with the network 1240, including, for example, the computer 1600, the service provider 1250, the target environment 1260 and the cluster 1280. The information may include, for example, packet data and/or non-packet data. Implementations of the network 1240 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1240 may include various network devices, such as, for example, routers, switches, firewalls, and/or servers. Portions of network 1240 may be wired (e.g., using wired conductors, optical fibers, etc.) and/or wireless (e.g., using free-space optical (FSO), radio frequency (RF), acoustic transmission paths, etc.). Portions of network 1240 may include a substantially open public network, such as the Internet. Portions of network 1240 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

The service provider 1250 may include logic (e.g., software) that makes a service available to another device in the distributed environment 1200. The service provider 1250 may include a server operated by an entity (e.g., an individual, a corporation, an educational institution, a government agency, etc.) that provides one or more services to a destination, such as computer 1600. The services may include software containing computer-executable instructions that may be executed, in whole or in part, by a destination, by the service provider 1250 on behalf of the destination, or some combination thereof.

For example, in an embodiment, service provider 1250 may provide one or more subscription-based services that may be available to various customers. The services may be accessed by a customer via a network, such as network 1240. The customer may access the services using a computer, such as computer 1600. The service provider 1250 may limit access to certain services based on, e.g., a customer service agreement between the customer and the service provider 1250. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 1280 may include a number of units of execution (UEs) 1270, 1272, 1274, etc. that may perform processing on behalf of computer 1600 and/or another device, such as service provider 1250. For example, in an embodiment cluster 1280 may parallel process graphical models created by, e.g., a customer. This parallel processing may include performing analysis on the models. The UEs 1270, 1272, 1274, etc. may reside on a single device or chip or on multiple devices or chips. For example, the UEs 1270, 1272, 1274, etc. may be implemented in a single application specific integrated circuit (ASIC) or in multiple ASICs. Likewise, the UEs 1270, 1272, 1274, etc. may be implemented in a single computer system or multiple computer systems. Other examples of UEs 1270, 1272, 1274, etc. include field programmable gate arrays (FPGAs), complex programmable logic devices (CPLDs), application specific instruction-set processors (ASIPs), microprocessors, etc.

The UEs 1270, 1272, 1274, etc. may be configured to perform operations on behalf of another entity. For example, in an embodiment, the UEs 1270, 1272, 1274, etc. may be configured to execute portions of code associated with the TCE 1210. Here, the TCE 1210 may dispatch certain activities pertaining to parallel processing activities to the UEs 1270, 1272, 1274, etc. for execution. In an embodiment, the service provider 1250 may configure cluster 1280 to provide interactive model design capabilities to computer 1600 on a subscription basis (e.g., via a web service). For example, one interactive design capability that may be provided in a subscription may include providing support to enable computer 1600 to perform model projections from one domain (environment) to another domain (environment).

Embodiments may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

Each of the blocks in the flowcharts of FIGS. 7, 8, 9, and 10 may be implemented with one or more computer-executable instructions. The one or more computer-executable instructions may be stored on one or more computer-readable mediums.

The foregoing description of embodiments provides illustration and description, but is not intended to be exhaustive or to limit the described herein to the precise form disclosed. Modifications and variations are possible in light of the above teachings or may be acquired from practice of the described herein. For example, while a series of acts has been described with regard to FIGS. 7, 8, 9, and 10, the order of the acts may be modified in other implementations consistent with the principles of the described herein. Further, non-dependent acts may be performed in parallel.

In addition, implementations consistent with principles of the described herein may be implemented using devices and configurations other than those illustrated in the figures and described in the specification without departing from the spirit of the described herein. Devices and/or components may be added and/or removed from the implementations of FIGS. 1, 2, 3, 4, 5 and 6 depending on specific deployments and/or applications. Further, disclosed implementations may not be limited to any specific combination of hardware.

Further, certain portions of the embodiments may be implemented as "logic" that performs one or more functions. This logic may include hardware, such as hardwired logic, an application-specific integrated circuit, a field programmable gate array, a microprocessor, software, wetware, or any combination of hardware, software, and wetware.

No element, act, or instruction used in the description of the application should be construed as critical or essential unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The examples and embodiments described herein are non-limiting examples.

The scope of the application is defined by the claims and their equivalents.

While various embodiments have been described above, it should be understood that they have been presented by way of example only, and not limitation. Thus, the breadth and scope of the present application should not be limited by any of the above-described embodiments, but should instead be defined only in accordance with the following claims and their equivalents.

What is claimed is:

1. A computer-implemented method, comprising:
   modifying with a computer one or more elements of an executable block diagram comprising a plurality of elements to produce a modified block diagram;
   creating a first change record and a second change record, the first change record and the second change record including one or more change entries, the one or more change entries associated with the one or more modified elements, the first change record and the second change record further identifying one or more modifications applied to one or more elements to produce the one or more modified elements;
   receiving one or more commentaries related to the one or more modifications;
   associating at least one of the one or more commentaries with at least one of the one or more change entries in the first change record and the second change record;
   associating the first change record and one or more unchanged first elements with a first revision of the block diagram;
   associating the second change record and one or more unchanged second elements with a second revision of the block diagram;
   maintaining a first selection of the first revision of the block diagram while concurrently receiving a second selection of the second revision of the block diagram;
   identifying differences between the first selected revision of the block diagram and the second selected revision of the block diagram, wherein both the first selected revision of the block diagram and the second selected revision of the block diagram are concurrently selected;
   selecting indications for displaying the identified differences in the selected revisions;
   displaying the selected indications;
   displaying concurrently at least a portion of:
      the first revision of the block diagram, the first revision including:
         one or more modified first elements associated with the first change record,
         one or more unchanged first elements, and
         one or more first commentaries of the one or more commentaries, the one or more first commentaries proximate to the displayed one or more modified first elements;
      the second revision of the block diagram, the second revision including:
         one or more modified second elements associated with the second change record,
         one or more unchanged second elements, and
         one or more second commentaries of the one or more commentaries, the one or more second commentaries proximate to the displayed one or more modified second elements; and
   concurrently executing the first revision of the block diagram and the second revision of the block diagram, wherein said displaying the selected indications comprises concurrently displaying results of the execution of the selected revisions.

2. The computer-implemented method of claim 1, further comprising:
   identifying a third revision of the block diagram, the third revision one of a plurality of stored revisions that includes a modified third element;
   selecting indications for visualizing the modification of the modified third element;
   displaying the identified third revision with the visualized modification; and
   displaying a change entry with at least one of the one or more commentaries proximate to the visualized modification.

3. The computer-implemented method of claim 1, further comprising:
displaying one or more change entries with at least one of the one or more commentaries proximate to a corresponding visualized difference.

4. The computer-implemented method of claim 1, further comprising:
visibly distinguishing corresponding identified differences in the selected revisions from one another at least by one of a color, texture or line width.

5. The computer-implemented method of claim 1, wherein the one or more commentaries comprise at least one of a text, an audio, or a video clip of modifying the block diagram.

6. The computer-implemented method of claim 1, further comprising:
receiving change records associated with corresponding selected revisions;
comparing the change records;
identifying differences between the change records based on the comparing; and
displaying the identified differences on a display.

7. A method as set forth in claim 1, comprising one of:
downloading software to a computer system, which software, when executed by the computer system, causes the computer system to perform operations comprising the method of claim 1; or
providing downloadable software to a computer system, which software, when executed by the computer system, causes the computer system to perform operations comprising the method of claim 1.

8. The method as set forth in claim 1, wherein the one or more modifications applied to the one or more elements to produce the one or more modified elements are semantic modifications.

9. The computer-implemented method of claim 1, wherein one of the displayed revisions is displayed as a transparent overlay of the other displayed revision.

10. A computer system, comprising:
a graphical user interface to receive and display a block diagram comprising elements;
an input device to:
receive one or more modifications to one or more elements of the block diagram, and
receive one or more commentaries related to the one or more modifications;
a model tool executed by a processor to modify the block diagram to produce a modified block diagram;
a change history tool to:
create a first change record and a second change record, the first change record and the second change record comprising one or more change entries, and
associate the one or more change entries with the one or more modifications for one or more elements of the block diagram;
associate the first change record and one or more unchanged first elements with a first revision of the block diagram, and
associate the second change record and one or more unchanged second elements with a second revision of the block diagram;
an output device to concurrently display:
at least a portion of the first revision of the block diagram, the first revision including:
one or more modified first elements associated with the one or more first change records,
one or more first commentaries of the one or more commentaries, the one or more first commentaries associated with the one or more first change records and displayed proximate to the displayed modified first elements, and
the one or more unchanged first elements, and
at least a portion of the second revision of the block diagram, the second revision including:
one or more modified second elements associated with the one or more second change records,
one or more second commentaries of the one or more commentaries, the one or more second commentaries associated with the one or more second change records and displayed proximate to the displayed modified second elements, and
the one or more unchanged second elements;
a selector to maintain a first selection of the first revision of the block diagram while concurrently receiving a second selection of the second revision of the block diagram for display on the graphical user interface, wherein the selector facilitates a selection of revisions of the block diagram to be concurrently executed, results of the executions to be displayed concurrently on the graphical user interface;
a difference identifying tool to identify differences between the first selected revision of the block diagram and the second selected revision of the block diagram, wherein both the first selected revision of the block diagram and the second selected revision of the block diagram are concurrently selected; and
a visualization tool to visualize the identified differences in the displayed revisions, wherein the visualization tool displays the identified differences to be distinguishable from one another on the graphical user interface in the results of the revisions being executed.

11. The system as set forth in claim 10, wherein:
the selector selects a revision of the block diagram to be displayed on the graphical user interface; and
the visualization tool visualizes the modification of one or more elements of the block diagram on the displayed block diagram; and further comprising
a change history window to display the one or more change entries and at least one of the one or more commentaries proximate to the displayed one or more modifications.

12. The system as set forth in claim 10, further comprising:
change history windows to display the one or more change entries, associated with the block diagram element modifications, with at least one of the one or more commentaries proximate to corresponding displayed differences.

13. The system as set forth in claim 12, wherein corresponding identified differences in the selected revisions are distinguished from one another at least by one of a color, texture or line width.

14. The system as set forth in claim 10, wherein the one or more commentaries comprises at least one of a text, an audio, or a video clip of modifying the block diagram.

15. The system as set forth in claim 10, wherein the block diagram comprises a model.

16. The system as set forth in claim 10, wherein the modification to one or more elements of the block diagram is a semantic modification.

17. The system as set forth in claim 10, wherein the first revision is displayed transparently contemporaneously over the second revision.

18. A tangible non-transitory computer-readable medium storing computer-executable instructions for visualizing a change history to a block diagram, the computer-readable medium holding:

one or more instructions for receiving a block diagram comprising one or more elements;
one or more instructions for receiving one or more modifications for one or more elements of the block diagram from a user;
one or more instructions for creating a first change record and a second change record comprising:
one or more instructions for creating one or more change entries, and
one or more instructions for associating each created change entry with a corresponding modification of one or more of the elements of the block diagram;
one or more instructions for receiving one or more commentaries describing one or more properties of the modified one or more elements of the block diagram;
one or more instructions for associating at least one of the one or more commentaries with at least one of the one or more corresponding change entries;
one or more instructions for selecting an indication of the block diagram element modification;
one or more instructions for associating the first change record and one or more unchanged first elements with a first revision of the block diagram;
one or more instructions for associating the second change record and one or more unchanged second elements with a second revision of the block diagram;
one or more instructions for maintaining a first selection of the first revision of the block diagram while concurrently receiving a second selection of the second revision of the block diagram;
one or more instructions for identifying differences between the first selected revision of the block diagram and the second selected revision of the block diagram, wherein both the first selected revision of the block diagram and the second selected revision of the block diagram are concurrently selected;
one or more instructions for selecting indications for displaying the identified differences in the selected revisions;
one or more instructions for displaying the selected indications;
one or more instructions for concurrently displaying:
at least a portion of the first revision of the block diagram, the first revision including:
one or more modified first elements associated with the first change record, and
one or more unchanged first elements, and
one or more first commentaries of the one or more commentaries, the one or more first commentaries proximate to the displayed one or more modified first elements, and
at least a portion of the second revision of the block diagram, the second revision including:
one or more modified second elements associated with the second change record,
one or more unchanged second elements, and
one or more second commentaries of the one or more commentaries, the one or more second commentaries proximate to the displayed one or more modified second elements; and
one or more instructions for concurrently executing the first revision of the block diagram and the second revision of the block diagram, wherein said one or more instructions for displaying the selected indications comprises one or more instructions for concurrently displaying results of the concurrent execution of the selected revisions and the identified differences.

19. The medium as set forth in claim 18, further holding:
one or more instructions for displaying the one or more change entities, associated with the one or more block diagram element modifications, with at least one of the one or more commentaries proximate to one or more corresponding differences.

20. The medium as set forth in claim 18, wherein the modifications for one or more elements of the block diagram are semantic modifications.

21. The medium as set forth in claim 18, wherein one of the displayed revisions is displayed as an overlay of the other displayed revision.

* * * * *

UNITED STATES PATENT AND TRADEMARK OFFICE
CERTIFICATE OF CORRECTION

| | | |
|---|---|---|
| PATENT NO. | : 8,667,381 B1 | Page 1 of 1 |
| APPLICATION NO. | : 12/053386 | |
| DATED | : March 4, 2014 | |
| INVENTOR(S) | : Feng et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1231 days.

Signed and Sealed this
Second Day of June, 2015

Michelle K. Lee
*Director of the United States Patent and Trademark Office*